United States Patent [19]

Weihrauch

[11] Patent Number: 5,087,403
[45] Date of Patent: Feb. 11, 1992

[54] PROCESS FOR PRODUCING PLASTIC BRISTLE ARTICLES

[75] Inventor: Georg Weihrauch, Wald-Michelbach, Fed. Rep. of Germany

[73] Assignee: Coronet-Werke Heinrich Schlerf GmbH, Wald-Michelbach, Fed. Rep. of Germany

[21] Appl. No.: 485,638

[22] Filed: Feb. 27, 1990

Related U.S. Application Data

[62] Division of Ser. No. 199,905, May 27, 1988, Pat. No. 4,954,305.

[30] Foreign Application Priority Data

Jun. 5, 1987 [DE] Fed. Rep. of Germany ... P3718811.9

[51] Int. Cl.⁵ .................. B29C 45/06; B29C 31/42
[52] U.S. Cl. ................... 264/157; 264/248; 264/294; 264/243; 264/328.8; 264/328.11; 300/11
[58] Field of Search ............ 264/243, 163, 328.11, 264/328.8, 328.7, 297.5, 248, 294, 297.8, 297.6, 157; 425/384, 575, 508, 510, 517, 572, 574, 576; 300/11, 21; 29/785; 156/72, 293, 423, 556

[56] References Cited

U.S. PATENT DOCUMENTS

| | | |
|---|---|---|
| 65,418 | 7/1900 | Schwartz . |
| 105,373 | 7/1870 | Ruset . |
| 2,303,800 | 12/1942 | Swann . |
| 3,408,112 | 10/1968 | Piotrowski . |
| 4,132,449 | 1/1979 | Bergman . |
| 4,635,313 | 1/1987 | Fassier et al. . |
| 4,637,660 | 1/1987 | Weihrauch . |
| 4,931,006 | 6/1990 | Schwyn et al. ............ 425/125 |

FOREIGN PATENT DOCUMENTS

| | | |
|---|---|---|
| 8459336 | 6/1953 | Fed. Rep. of Germany . |
| 1050304 | 2/1959 | Fed. Rep. of Germany . |
| 2812746 | 9/1979 | Fed. Rep. of Germany . |
| 28089659 | 9/1979 | Fed. Rep. of Germany . |
| 2849510 | 6/1980 | Fed. Rep. of Germany . |
| 2922877 | 12/1980 | Fed. Rep. of Germany . |
| 55-112736 | 8/1980 | Japan .................... 29/785 |

*Primary Examiner*—Jeffery Thurlow
*Assistant Examiner*—Mathieu Vargot
*Attorney, Agent, or Firm*—Antonelli, Terry, Stout & Kraus

[57] ABSTRACT

Bristle articles can be manufactured in that the bristle carrier and optionally the ends of the bristles are melted and brought together under pressure, or the bristles are introduced into an injection or foaming mould for the bristle carrier and are embedded in the bristle carrier material by injection moulding or foaming. The cycle time of these processes is extremely long as a result of the thermal processes (heating, melting, injection moulding, cooling). It is possible to significantly reduce the same in that the tools for holding or producing the bristle carrier on the one hand and the clamping devices for the bristles on the other are moved on closed paths and the clamping devices at at least one common station are transferred to the path of the tools and at least during the thermal processes are jointly moved with the tools and are subsequently returned to their movement path.

5 Claims, 7 Drawing Sheets

PROCESS FOR PRODUCING PLASTIC BRISTLE ARTICLES

This is a division of application Ser. No. 07/199,905, filed May 27, 1988, now U.S. Pat. No. 4,954,305.

TECHNICAL FIELD

The invention relates to a process of plastic bristle articles comprising a bristle carrier and bristles, in that on a first movement path in successive stations the bristles are taken up by means of following clamping devices in a number and arrangement corresponding to the bristle occupancy of the finished bristle article, are melted at the end thereof facing the bristle carrier and optionally shaped and on a second movement path in successive stations the bristle carriers by means of jointly rotating holders are melted at least zonely at their side receiving the bristles and/or provided with bristle reception holes and finally the bristles and bristle carriers timed between the stations are brought together in the still plastic state.

The invention also relates to an apparatus for performing the process.

BACKGROUND ART

Of late, bristle articles such as brushes, brooms, paintbrushes, etc. have been increasingly made entirely from plastic. Numerous attempts have been made to replace the still conventional mechanical fixing of the bristles to the bristle carrier by thermal joining processes, in which on the bristle reception side of the bristle carrier and optionally the fixing end of the bristles are brought by melting into a soft plastic state and subsequently brought together under pressure action. In certain circumstances, it is sufficient to only zonely melt the bristle carrier at points where individual bristle bundles are to be fixed. On melting the bristle ends of a bristle bundle the plastic flows together to form a thickened portion, which simultaneously forms the basis for joining together the bristles. As a function of the material pair of the bristles and bristle carrier, a welded joint is obtained, i.e. an integral joint between the two materials, or a jointing connection, in which the bristles with their thickened end are surrounded by the soft plastic material of the bristle carrier and in this way are positively secured (DE-OS 34 03 341 which corresponds to U.S. Pat. No. 4,637,660).

The economics of this process is decisively dependant on the operating speed of the equipment used for it. Thus, it is known to bring a bristle endless strand up to the apparatus, cut off the bristle bundles with the desired length from the strand and after simultaneously heating the bristle carrier reception side and the bristle ends to bring same together and keep them in this state until, after adequately cooling, a firm joint has been made (DE-OS 34 03 343 and DE-OS 28 12 746). In this process the supply, cutting off, melting, joining and cooling take place at a single working station. The cycle time of an apparatus operating according to this process is naturally very long and in particular longer than in mechanical fixing processes, so that this only to a limited extent permits an economic manufacture of bristle articles.

It has therefore also been proposed (DE-OS 28 49 510) to provide on a turntable several holders reciprocately arranged with the same angular distances and which can in each case receive a plastic bristle carrier. In a first station the bristle carriers are fed from a magazine into a holder on the turntable. In the following station the bristle reception side of the bristle carrier is melted and simultaneously reception holes formed. At the third station the bristle bundles are supplied from the endless strand from the outside and all the bundles of a bristle occupancy or coverage are simultaneously supplied. The leading ends of the bristle bundles are melted in said station and subsequently pressed onto the bristle reception side of the bristle carrier. Following cooling adequate for transfer the bristle carrier with the mounted bristles passes into a further cooling station and then into a first further processing station, in which the bristles are cut to the final size and then into yet another further processing station in which the brush is cleaned and trimmed. Finally the finished brush passes into the position where it is discharged and a new bristle carrier supplied. In this process the longest cycle time occurs at the bristle supply station, where simultaneously the bristles and bristle carriers are melted and the two are brought together. There must subsequently be an adequate cooling time in order to achieve the hardening of the melt necessary for transfer. All the other working steps can in theory be performed more rapidly, but this is not possible due to the long cycle time at the supply and jointing station.

Much the same is the case in the aforementioned process (DE-OS 28 08 965), in which two turntables with parallel axes are juxtaposed, whereof one has in several positions holders for the bristle carriers and the other in several positions clamping devices for the bristle bundles. The turntable with the holders for the bristle carriers moves past a magazine from which in each use one bristle carrier is transferred into a holder. The holder then moves past a station with a heating device, where the bristle reception side is melted and simultaneously provided with reception holes. The bristle carrier then passes into a station, where the two turntables are in contact. The other turntable has at a first station a transfer mechanism, by means of which the already cut bristle bundles are removed from a magazine in a number corresponding to the occupancy or coverage and placed in the clamping device located on the turntable. In a second station the free bristle ends, which are used for fixing purposes are moved in front of a heating device, which melts the bristle ends thus joining them together. Finally the clamping device with the terminally melted bristle bundles pass into a common station, in which the bristles are transferred to the bristle carriers on the other turntable, pressed onto the bristle reception side and the bristles and bristle carriers are cooled until they can be transferred. The bristle carriers covered with the bristles are then moved into a discharge station. Compared with the previously mentioned process, a clock cycle reduction is obtained in that the melting of both the bristle carrier and the bristles takes place at an individual station of the two turntables, whereas only the bringing together and cooling are performed on the common station. However, this cycle time reduction is only insignificant, because the bringing together and jointing of bristles and bristle carriers, as well as the cooling necessary prior to transfer still lead to a long cycle time.

Apart from the aforementioned welding and jointing process, it has been known since the occurrence of plasticly deformable or molten-processable and finally foamable plastics, to produce the bristle carrier in moulds, dies, injection moulds or foaming moulds and in connection with said production to imbed the ends of the bristles in the plastic (U.S. Pat. Nos. 105,373, 654,184, 2,303,800, 3,408,112, 4,132,449, German Patent 845 933 and DE-AS 1 050 304). The bristles are introduced into one of the two mould parts of the single-split mould through reception openings until their ends project into the mould cavity and this is followed by moulding, injection moulding or foaming. After an adequate cooling or curing phase the finished bristle article is removed. However, the operating cycles are even longer than in the previously described welding and jointing processes due to the larger plastic quantity and therefore longer cooling time. In addition, as a result of the short clamping length of the linear bristles, they only have an inadequate resistance to tearing out. It has therefore already been proposed to initially melt the bristle ends and to shape them to a head (German Patent 845 933) or to shape all the bristle ends of a bristle coverage to a plate (DE-AS 10 50 304) and only then imbed same in the plastic of the bristle carrier. Although from the use standpoint this leads to better products, the cycle time is increased.

In order to speed up the cycle time, it is known (EP-OS 142 885 which corresponds to U.S. Pat. No. 4,685,313) to provide bristle holders in the form of a plurality of through holes in several index positions on a rotary table, in which the cut bristle bundles are inserted and finally made flush at their rear end, followed by melting at the fixing side end to a thickened portion and finally connected to one half of an injection mould, whose other half is to shape the planar bristle holders. Thus, in this case, the preparatory work on the bristles is carried out at several stations of a rotary table, the injection moulding in the injection mould taking place in the final station. However, even here there is a comparatively long cycle time due to the injection moulding and the cooling of the mould necessary for curing. The sealing of the bristle bundles or the reception holes with respect to the injection moulding material is also inadequate, because on the one hand the bristles cannot be sufficiently densely packed by merely inserting into the reception holes and on the other hand at the start of injection moulding, as a result of the pressure building up isostatically and which also acts behind the thickened portions on the bristle ends, the bristles are drawn into the mould and the thickened portions are raised from the mould-side opening edge of the reception holes. Therefore the injection moulding material penetrates between the bristles and between the latter and the wall of the hole. This leads to an unclean termination on the bristle carrier and the use-desired flexibility of the bristle bundles is unfavourably influenced and becomes non-uniform.

In another known process DE-OS 29 22 877) the reverse procedure is adopted, in that in each case one injection mould is positioned at several index positions on a rotary table and has in one mould part reception opening for the bristles. In the first index position the cut-to-size bristles are removed bundlewise from a magazine by means of cut-out tubes and subsequently inserted by the latter into the reception holes of the injection mould. At the same station injection moulding of the mould takes place and subsequently further rotation takes place into a cooling station. The further working of the bristles on the opened mould takes place in another station and finally the finished bristle article is removed from the mould. This process makes it possible to more significantly reduce the operating cycle, because injection moulding and cooling are distributed over different stations, but it is still unsuccessful as a result of the aforementioned problem of sealing the reception holes requiring special measures, particularly as the bristles are necessarily relatively loosely seated in said holes and also, as a result of the insertion of the bristles directly into the moulds, it is not possible for thickened portions to form on the bristle ends. Therefore injection moulding of the mould takes place in two stages, namely firstly part of the plastic is injected at a low pressure until the bristle ends are enveloped. Following the solidification of this melt, the remaining cavity space is filled in a second stage. This two-stage injection moulding with an intermediate cooling phase is technically complicated and timeconsuming.

DISCLOSURE OF INVENTION

The problem of the present invention is to make the aforementioned process more economic by shortening the cycle time and also to propose apparatuses for performing the process.

According to the invention, this problem is solved in connection with the aforementioned process of welding or jointing (DE-OS 28 08 965) in that the clamping devices with the bristles or the holders with the bristle carriers at a transfer station at the start of a transfer and cooling section are brought from one movement part onto the other and at the end of the transfer and cooling section the bristles are detached from the clamping device and the latter or the holders are returned to their own movement part.

Preferably the movement parts of the clamping devices and the holders for the bristle carriers, at least along the transfer and cooling section having several stations, are guided in parallel and in the same movement direction.

Due to the fact that the particular mounting support, namely either the clamping device or the bristles or the holder for the bristle carriers are transferred at the transfer station together with the bristles or bristle carrier from one movement part onto the other, there is no need for reclamping or the like and the bristles or bristle carriers retain their precise position on the in each case other movement part. As a result of the parallel arrangement of the movement parts of the bristles and bristle carriers along the transfer and cooling section, it is possible immediately after the transfer of the bristles to the bristle carriers or vice-versa, to distribute the actual jointing and cooling process over several following stations, so that the hitherto longest cycle time is subdivided into several individual time cycles of shorter duration. At the end of the transfer and cooling section, the clamping devices are released, so that the bristles are made free and can be further worked in optionally several stations. If the clamping devices are transferred from one movement part to another, immediately following the release of the bristles they travel back to their own movement part, whilst the holders for the bristle carriers are preferably also used in the further working stations for holding the finished bristle article. If the holders are transferred from one movement path to the other, then the stations for further working or reworking can be provided on one or other movement path.

According to a preferred construction, the clamping devices with the bristles and the holders with the bristle carriers are moved on the same diameter of parallel, coaxial circular paths and at the transfer station are moved axially parallel between the two.

This construction makes it possible to perform all the working or treatment processes on the bristles and bristle carrier in a confined space. Moreover the transfer paths for the holders or clamping devices are of a minimum nature. As the cycle time of the individual processing operations can be minimized by multiple stations, the cycle time is substantially only dependant on the time required for the transfer. Instead of the aforementioned construction, it is also possible for the clamping devices with the bristles and the holders with the bristle carriers to be moved on concentric circular paths and radially between the two at the transfer station.

In a further development of the inventive process the bristles at a first station are supplied in axially parallel oriented manner to an opened clamping device, are fixed in the latter, optionally during their further movement path are moved past several heating stations for melting their ends projecting beyond the clamping device and optionally past a shaping station for shaping a thickened portion on the melted bristle ends, while simultaneously on the other movement path the bristle carriers are inserted in axially parallel manner in a holder, zonely melted on the bristle reception side and/or reception holes are formed, followed by transferring in the transfer station of the holder with the bristle carrier and the bristle reception side first to the other movement path, where locking takes place with the clamping device, accompanied by the penetration of the bristle ends into the bristle reception side of the bristle carrier, in the following stations the unit comprising the holder and the clamping device is cooled, at the end of the transfer and cooling section the device is released and the holder with the finished bristle article is returned to the first bristle path and the bristle article removed from the holder.

Furthermore, after returning the holder with the finished bristle article, the free bristle ends can be reworked at at least one further station, e.g. trimmed, rounded, etc.

For solving the problem of the invention in the case of the other process type of embedding the bristle ends by injection moulding or foaming the bristle carrier in a mould receiving the bristles, the invention is based on the known process (DE-OS 29 22 877), in which the bristles are introduced in an arrangement and number corresponding to the bristle coverage into the reception openings of an at least single-split mould, where the bristle carrier is produced by injection moulding or foaming and several moulds on a closed first movement path are moved in a cycle past the station supplying the plastic for the bristle carrier, at least one cooling station and a removal station for the finished bristle article.

The inventive problem is solved in this process in that the bristles are gripped by means of a clamping device having the reception openings and forming part of the mould and several clamping devices are guided on a second movement path with at least one processing or treatment station for the bristles and that the clamping devices together with the bristles at a transfer station and whilst completing the mould are transferred to the first movement path, after the final cooling station and whilst releasing the bristles and are returned to the second movement path following the removal station.

In this solution the invention also makes use of the principle that the clamping device receiving the bristles is transferred from one movement path on which the bristles can be prepared and finished to the other movement path with the injection moulding or foaming moulds and are guided there over a long distance, which permits a random breaking down of the operating cycles or injection moulding or foaming and cooling. On introduction into the clamping device, the bristles are precisely positioned, as is required in all the following operating cycles. Only following the production of the bristle article are the clamping devices returned to their movement path. To permit this, the clamping device must form part of an at least single-split mould, namely taking over the moulding of at least the bristle reception side of the bristle carrier. The clamping device offers the possibility of introducing the bristles in problemfree manner into the opened means and to firmly and closely secure same by closing the clamping device, so that on the one hand a precise and invariable positioning is ensured and on the other the bristles are densely packed, so that during the injection moulding or foaming the plastic cannot penetrate between them and the reception holes.

The inventive construction also provides the possibility of moving the clamping devices receiving the bristles on a second movement path past a supply station where the bristles are introduced into the clamping device, at least one heating station where the fixing-side ends of the bristles are melted and a cooling station, prior to passing into the transfer station. It is also possible to mould the melted bristle ends on the second movement path in a moulding station between the heating station and the cooling station to form a head, a plate or the like.

The head or plate can be directly shaped on the opening edge of the reception openings in the clamping device, so that in conjunction with the fixing of the bristles a completely satisfactory sealing with respect to the mould cavity is obtained.

Finally, following the removal station, the finished bristle article can undergo reworking at one or more stations of a further movement path, e.g. the bristles can be recut, rounded or cleaned.

Plastic bristles make it possible to work on the endless strand. This procedure can be integrated into the inventive process in that during the processing of the bristles from an endless strand, the latter is fixed by the leading end in the clamping device and the bristle can be cut off at a distance from the leading end of the endless strand corresponding to the desired length, plus that necessary for fixing.

For performing the aforementioned process, the invention is based on a known apparatus (DE-OS 28 08 965) with a conveying means having a circular movement path with a plurality of stations with in each case one clamping device for the bristles and at its first station a supply device for the bristles to the clamping device, at optionally further stations a heating device for melting and shaping the bristle ends and at a further station the bristles are transferred to another circular movement path of a conveying means, which in turn has several stations with in each case one holder for the bristle carrier and at its first station the bristle carrier is fed into the holder, at a further station the bristle reception side is melted by means of a heating device and/or the shaping of the bristle reception holes takes place.

This known apparatus is constructed for solving the inventive problem in such a way that the circular paths are arranged coaxially and the conveying means are driven in the same direction and that behind the stations with the heating device are provided several stations of a transfer and cooling section, at the first of which is provided a device for transferring the holder with the bristle carrier or the clamping devices with the bristles to the in each case the other circular path and that on the latter a gripping device is provided, by means of which the bristle carrier and the bristles in the clamping device are held together and at the following stations is provided a cooling device for the bristles and bristle carrier.

The two coaxial circular paths can be arranged in horizontally superimposed or vertically juxtaposed manner and in this way require a minimum amount of space. For transferring the clamping device with the bristles from one circular path to the other or for the alternatively possible transfer of the holder with the bristle carriers to the circular path with the clamping devices, it is merely necessary to overcome the distance between the two circular paths. In addition, only one drive need be provided for the two circular paths.

According to an embodiment the conveying means comprises in each case a turntable having on circular paths with the same diameter the clamping devices for the bristles or the holders for the bristle carriers and which are equiaxially arranged and driven in the same direction and that the transfer device for the clamping devices or for the holders is moved in axially parallel manner between the two turntables. In order to minimize the distance between the two circular paths, the processing operations are preferably performed on the faces pointing in the same direction, so that only the processing tools for one turntable project between the turntables. The heating and cooling devices, as well as the gripping devices for holding together the bristle carrier and clamping device can be arranged in fixed manner, so that the clamping devices and/or bristles on the one hand and the holders and/or bristle carriers on the other travel past the same. Instead of this, they can also be moved forward and back to the necessary extent at the stations.

Instead the conveying means can be formed by a single turntable, which on different diameter circular paths has the clamping devices for the bristles or the holders for the bristle carriers and that the transfer means is radially movable between the two circular paths. In this way it is possible to perform all the operating processes in one plane with the shortest possible paths.

According to an embodiment of the invention with the turntable and bristle clamping devices are associated one or more shaping or moulding devices arranged between the last station with a heating device for the bristle ends and the transfer station and by means of which the melted bristle ends are shaped to form a head, plate, etc. This is in particular advantageous if the bristles and bristle carriers are made from plastics, which cannot be welded together. The thickened portion is pressed into the soft plastic material of the bristle carrier and said material flows behind the same, so that a positive anchoring is obtained. In the case of weldable plastics the shaping or re-shaping of the thickened portion formed during melting at the bristle end is generally not necessary.

According to another embodiment between the last station of the transfer and cooling section and a removal station for the finished bristle article is arranged at least one further station for re-working the free bristle ends, e.g. for re-cutting, rounding, etc.

Furthermore, upstream of the heating device for melting the bristle ends can be provided a device by means for which the bristle bundle is contoured at the bristle use end. This process requires a detatchment of the clamping device to permit axial displacement of the bristles.

If, as is preferably provided, the holders with the bristle carriers can be transferred to the other turntable, the gripping device arranged at the transfer station for holding together the bristle carrier with the bristles located in the clamping device on the transfer and cooling section is located on the circular path with the clamping devices. These gripping devices can optionally also only be jointly movable over the necessary number of stations, whilst otherwise being returnable.

The heating devices for the bristles are preferably arranged in fixed manner on the apparatus and advantageously extend over several stations. Thus, the bristles are moved by means of the turntable past the fixed heating devices.

If there is a shaping unit for the melted bristle ends, then it extends over several stations and is also fixed, but fitted so as to be displaceable in axially displaceable manner and can be moved forwards and backwards by in each case one station together with the turntable.

Finally, it is inventively provided that a reversing device for the holders and/or bristle carriers or for the clamping devices with the bristles acting between the two circular paths on or upstream of the transfer station and by means of said reversing device the fixing-side bristle ends and the bristle reception side of the bristle carrier can be made to face one another. This reversing device can be provided both in the case of concentrically arranged circular paths and also paths arranged in parallel planes.

If, as is preferably the case, bristles are processed from the endless strand, then it is inventively provided that the bristle supply device comprises a gripping device displaceable in axially parallel manner to the turntable and which grips the leading end of the endless strand by a projecting length roughly corresponding to the desired bristle length and introduces same into the clamping device to such an extent that at the opposite side the bristles project by the amount necessary for the fixing thereof to the bristle body and that with the gripping device is associated a cutting mechanism effective at its front face and which after the release and return of the gripping device to the initial position cuts off to the desired length the bristles gripped by the clamping device.

Thus, the bristles are supplied from one side of the turntable and forced through the clamping device, so that the end thereof projects over the opposite side of the turntable, where melting takes place and optionally re-shaping. If processing or treatment of the bristle ends is to take place at the turntable supply side, e.g. if the clamping devices are to be transferred to the other turntable, then the bristles are inserted into the clamping device by the gripping device until the front face of the latter has a distance from the facing end face of the clamping device or turntable facing it and consequently at this side the bristles have the projecting length necessary for melting and optionally shaping.

Advantageously the gripping device supplying the bristles and the bristle clamping devices on the turntable have centres engaging in one another, in order to ensure a completely satisfactory introduction of the bristles by means of the gripping device into the clamping devices.

For performing the second type of process, in which the bristle ends are embedded in the bristle carrier by injection moulding or foaming, the invention is based on a known apparatus (DE-OS 29 22 877) with a first conveying means having a circular movement path, which has a plurality of stations with in each case at least one singlesplit injection or foaming mould for the bristle carrier with reception openings for the bristles and at its first station is provided a supply device for the bristles and which has a station for the supply of the plastic to the injection or foaming mould, at least one cooling station and a removal station for the finished bristle article.

This known apparatus is inventively characterized in that between the supply device and the conveying means with the injection or foaming moulds is provided a second conveying means with several clamping devices for the bristles and at least one processing or treatment station for the same and that each clamping device has the reception openings in which the bristles are placed in a number and arrangement corresponding to the bristle coverage and are clampingly held with the free length necessary for fixing in the bristle carrier and forms part of the at least singlesplit injection or foaming mould, that between the two conveying means is provided a transfer device for inserting the clamping device in the open injection or foaming mould and that at or behind the removal station of the first conveying means is provided a device for returning the clamping devices released from the bristles to the second conveying means.

Unlike in the aforementioned prior art one of the mould parts does not have reception openings and instead they are provided on a clamping device fixing the bristles, which permits an exact positioning of the bristles and random preliminary work or treatment on said bristles and is also integrated at the transfer station into the mould on the other movement path, where it then forms part of said mould. Thus, here again the clamping devices also revolve from the bristle supply device until the finished bristle article is obtained.

Preferably both conveying means are constructed as turntables having a common transfer station with the transfer device for the clamping devices.

Advantageously at the second conveying means with the clamping devices is provided at least one station with a heating device for melting the free bristle ends. Thus, prior to the introduction into the mould, the ends of the bristles are melted and can optionally be shaped at a further station by means of a shaping device to the form of a head or plate, so as to bring about a completely satisfactory sealing of the mould and a firm anchoring of the bristles in the bristle carrier.

According to an embodiment the injection or foaming mould comprises two mould parts forming between them a mould separating or partition plane and whereof the force side mould part is formed by the clamping device. This construction is particularly advantageous for bristle articles in which the contour of the bristle carrier roughly corresponds to that of the bristle coverage and the bristle carrier serves directly as a handle, e.g. for hand washing and cleaning brushes.

According to another embodiment the injection or foaming mould comprises three parts, whereof two parts on the force side together form the force side shaping or moulding unit and one of these is the clamping device. This construction is e.g. advantageous for all brushes with handles, such as toothbrushes, kitchen brushes, etc. The entire brush body (bristle carrier and handle) is formed by two mould parts and only the bristle reception side of the bristle carrier is shaped from the clamping device. The latter construction is characterized in that the clamping device is displaceable in the other force side mould part between a position forming the latter in the operating state and a position in which the clamping device in the transfer station can be inserted into or removed from the mould. Thus, the mould has two mould separating planes, namely on the one hand the main seperating plane between the force side moulding unit and the cavity side mould part and on the other hand a seperating plane between the two mould parts forming the force side moulding unit, whereof one is the clamping device. This second separating plane permits the insertion and removal of the clamping device.

According to another embodiment on the injection moulding or foaming mould is provided a device for releasing the clamping device at the start of the mould release process. The bristles remain in the clamping device until the bristle carrier has cooled sufficiently to permit removal thereof from the mould. The clamping device is then released, so that during the mould release stroke the force side moulding unit is drawn from the bristles.

If the bristles are to be processed from the endless strand, then it is inventively provided that the bristle supply device comprises a gripping device movable in axially parallel manner to the turntable, which grips the leading end of the endless strand with a projecting length corresponding approximately to the desired bristle length and inserts same into the open clamping device to such an extent that on the opposite side the bristles project by the amount necessary for fixing to the bristle carrier and that with the gripping device is associated a cutting device acting on its front face and after releasing and moving back the gripping device into the initial position, cuts to the desired length the bristles gripped by the clamping device.

BRIEF DESCRIPTION OF DRAWINGS

The invention is described in greater detail hereinafter relative to non-limitative embodiments and the attached drawings, wherein show.

BEST MODE FOR CARRYING OUT THE INVENTION

Figure 1:
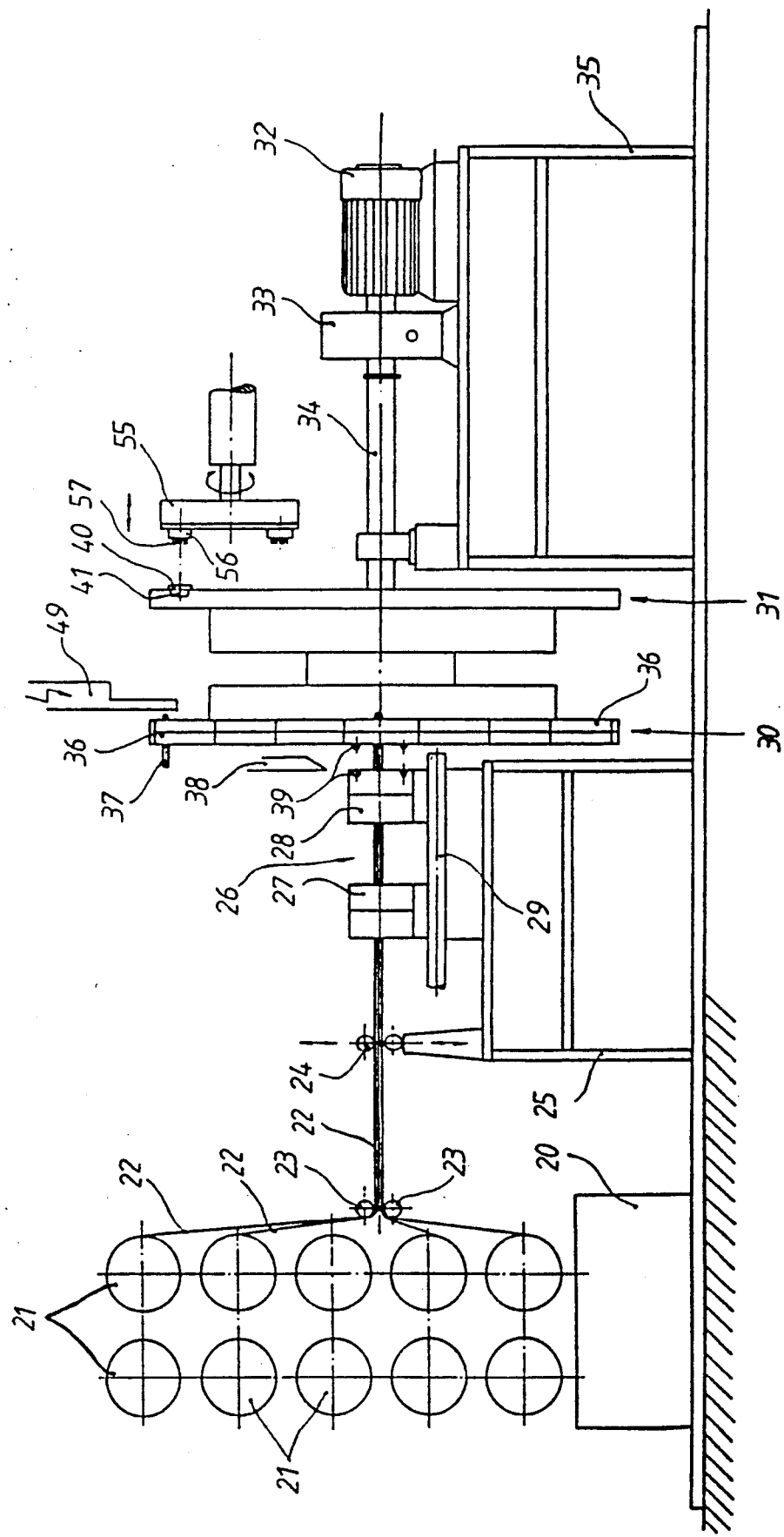
FIG. 1 a diagrammatic side view of the apparatus with two turntables.
Figure 2:
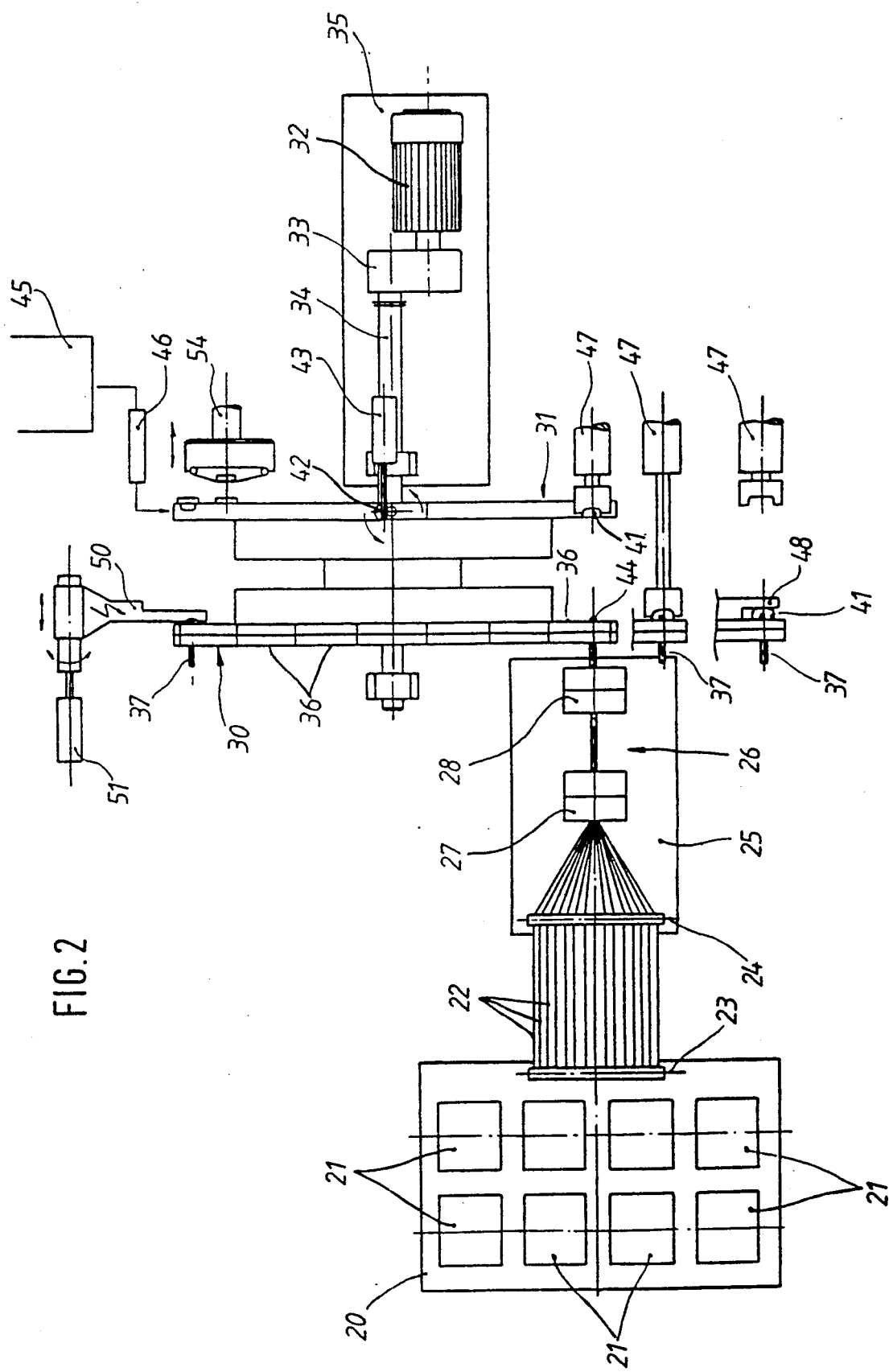
FIG. 2 a plan view of the representation according to FIG. 1.

The apparatus shown in FIGS. 1 and 2 has a reel rack 20 with several juxtaposed and superimposed reels 21, on which is located in each case one monofilament endless strand 22. The endless strands 22 are removed by means of guide rollers 23 from two superimposed transport rollers 24. The transport rollers 24 are located on a frame 25, which also carries a supply device 26 with two successively arranged gripping devices 27, 28. For reasons of simplicity, the drawing shows the bringing together of several monofilament endless strands 22 to one or more bristle bundles. As stated, instead of this the endless strands can be formed by bundles, which then in each case form a bristle bundle.

The two gripping devices 27,28 of the supply device 26 are displaceable against one another on a slide table 29 and in the closed state the gripping device 27 grips the bristle strand and by moving on slide table 29 inserts it into the open gripping device 28. After closing, the latter again grips the endless strand and supplies it to the turntable 30 arranged in front of frame 25. Equiaxially to the turntable 30 and parallel thereto is provided a further turntable 31, which are jointly driven by a drive motor 32, via a gear 33 and a shaft 34. Drive motor 32 and gear 33 are located on a further machine frame 35.

A plurality of clamping devices 36 are fixed to the turntable 30 and are provided with a number of receptacles for one or more bristle bundles corresponding to the number of receptacles on the gripping devices 27,28. The clamping devices 36 are movable between an open position, in which the gripping device 28 inserts the bristle strand and a closed position in which it firmly surrounds the bristle bundle or bundles 37. With the gripping device 28 is associated a cutting mechanism 38 (FIG. 1), which after inserting the endless strand in the opposite clamping device and after moving back the gripping device 28 into the position shown in FIGS. 1 and 2 cuts off a bristle bundle with the desired length from the endless strand. In order to ensure a completely satisfactory transfer of the bristle strands from the gripping device 28 into the clamping devices 36, centres 39 are provided on both. After cutting to length the endless strand by means of the cutting mechanism 38, the turntable 30 can be timed through the further working stations, which will be described relative to FIG. 3.

At the end remote from the bristle supply side, the other turntable 31 has a plurality of holders 40 for receiving in each case one bristle carrier 41. The holders 40 together with the bristle carrier, can be pivoted by 180° about a radially directed axis 42 (cf FIG. 2) by means of a reversing device 43 acting from the outside, so that the bristle reception side initially pointing to the right after inserting the bristle carrier in turntable 31 can be brought into a position in which it faces the turntable 30 or the ends 44 of the bristles bundles 37 projecting over clamping devices 36. A further reversing device 43 is located at the other position of turntable 31 in order to rotate back to their initial position the bristle carrier holders 40.

The bristle carriers are mounted in a magazine 45 (FIG. 2) from which they are removed and inserted by means of a device 46 in the holders 40 on turntable 31.

Holders 40 for bristle carriers 41 are displaceable in axially parallel manner and can be moved by means of a pressure medium cylinder 47 from turntable 31 to turntable 30, as is intimated in the bottom half of FIG. 2. During this displacement the bristle carrier 41 is pressed on to the bristle ends 44 of bristle bundles 37 and after returning the piston of pressure cylinder 47 are kept by means of a gripping device 48 in firm contact with the bristle bundles 37 or their ends 44.

Hereinafter it is described relative to FIGS. 3a-3v the timing sequence whereby in the upper row (FIGS. 3a-3i) are represented the working steps on the turntable 30 receiving the bristles and in the lower row (FIGS. 3j-3v) the working steps on the turntable 31 receiving the bristle carriers. In all there are 16 working cycles, which are numbered continuously 1 to 16. In the first cycle the bristle strand is inserted by means of gripping device 28 into the open clamping device 36 on turntable 30 until the leading ends 44 project over the front face of clamping device 36. The clamping device moves into the closed position, so that the bristle strand is fixed, whilst the opened gripping device 28 moves back into the initial position according to FIGS. 1 and 2. Then, by means of the cutting mechanism 38, the bristle strand is cut to length, so that one or more bristle bundles 37 of the desired length are located in clamping device 36. In the next three cycles 2 to 4 the bundle ends 44 move past a heating device 49, e.g. a heating reflector by means of which the bristle ends 44 are melted and welded together. The heating device 49, which extends over cycles 2 to 4, can be arranged in fixed manner.

In the two following work cycles 5 and 6, the melted bristle ends are shaped by means of a shaping or moulding unit 50 to give a clearly defined contour. This shaping unit 50 can, as is in particular apparent from FIG. 2, be moved an axially parallel manner by means of an operating cylinder 51, so as to bring it up to or away from the bristle ends. The shaping unit 50 is also appropriately fixed, but preferably accompanies the turntable 30 over the two cycles 5 and 6.

Following on to the shaping unit 50, the shaped bristle ends 45 can move past a cooling device 51, in order to obtain a shape-stable contour. This is particularly appropriate if the bristles and bristle carriers are made from non-weldable plastics and the bristle ends 44 are embedded in the soft plastic reception side of the bristle carrier.

In station 9 the bristle carrier previously reversed on turntable 31 is transferred by means of the pressure cylinder 47 from turntable 31 to turntable 30, where it is locked by means of gripping device 48 (cf also FIG. 2) with the clamping device 36. In this position or in working cycles 10 to 12 the bristle carriers 41 and bristle ends 44 are pressed together and optionally the previously soft plastic bristle reception side is reshaped and further cooled. In station 13 the clamping device is opened and the bristle carrier 41 with the bristle bundles 37 fixed thereto are returned to the turntable 31, where optionally the re-working reproduced in the lower part of FIG. 3b is performed in stations 14 and 15, whereby in station 14 an after-cutting and in FIG. 15 a finishing of the bristle ends, e.g. a rounding takes place. Finally the finished brush is removed in station 16 by means of a pressure cylinder 52. Adhering plastic residues and/or individual hanging bristles on the working side can be cleaned from the clamping device in stations 14 to 16 on turntable 30.

Figure 3:
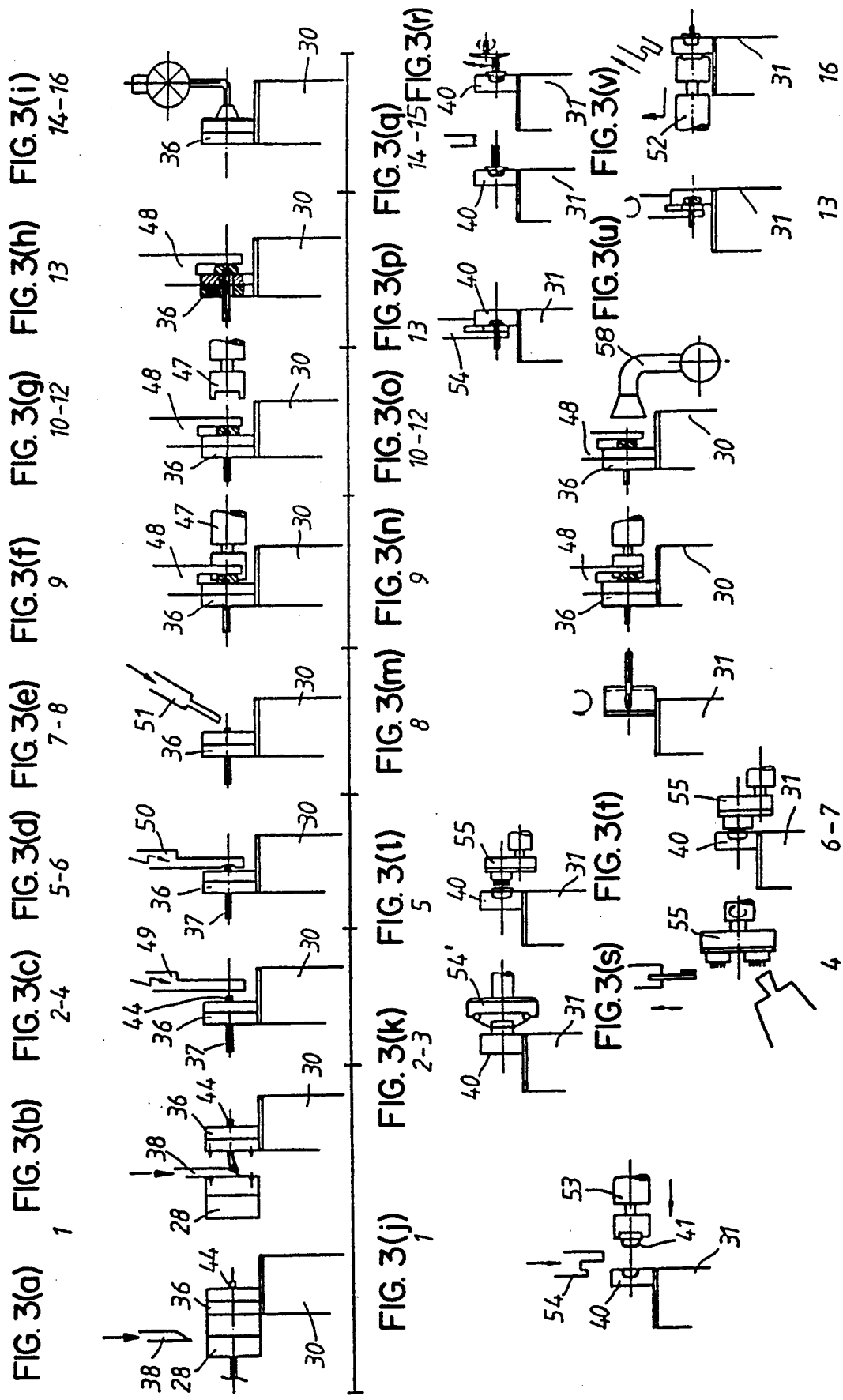
FIG. 3 a diagrammatic view of the individual working stages and namely in FIGS. 3a–3i on the bristle side and in FIGS. 3j–3v on the bristle carrier side.

The working steps on turntable 31 are shown in FIG. 3. The bristle carriers 41 are inserted by means of a manipulator 53 or the like in the holders 40 and held there by means of a bolt 54 or the like. From supply station 1, the holders 40 with the bristle carriers 41 pass into stations 2 and 3, in which a printing or stamping unit 54' running over these stations applies to a bristle carrier handle a marking or the like. The bristle carriers 41 then pass by means of turntable 31 into station 4, where a heating device 55 is fixed, but can be moved backwards and forwards over stations 4 to 7. In the represented embodiment the heating device 55 has a heating reflector 56 and several heating pins 57 (FIG.

1), by means of which blind holes can be made in the bristle reception side of bristle carrier 41, as is shown in stations 5 and 6. The heating device 55, which has 2 or 3 heating reflectors 56 with heating pins 57, can be returned from position 6 into position 4 in which the pins and heating device are mechanically and/or pneumatically cleaned.

The melting of the bristle reception side of the bristle carrier 41 and the stamping of the reception holes for the bristle bundles can extend over stations 5 to 7. This is dependant in the individual case on the size of the coverage surface, etc. In station 8 the bristle carrier is turned by 180° and is transferred in station 9 by means of pressure cylinder 47 from turntable 31 to turntable 30 and is held there in fixed contact with the bristle ends by means of gripping device 48, as has already been described relative to FIG. 3a. In stations 10 to 12, where the bristle carrier is pressed with the bristles and cooled, the back of the bristle carrier can be optionally heated by means of a hot air device 58, in order to compensate for the shrinkage process on the bristle reception side and prevent any distortion or warping of the bristle carrier 41. In station 13 holder 40 is removed from the clamping device 36, the bristle carrier being secured by bolt 54. The bristle carrier with holder 40 is then returned from turntable 30 to turntable 31, where it is reversed, as can be gathered from the bottom representation of position 13. This is followed by the already described re-working in stations 14,15 and subsequently the removal in station 16.

Figure 4:
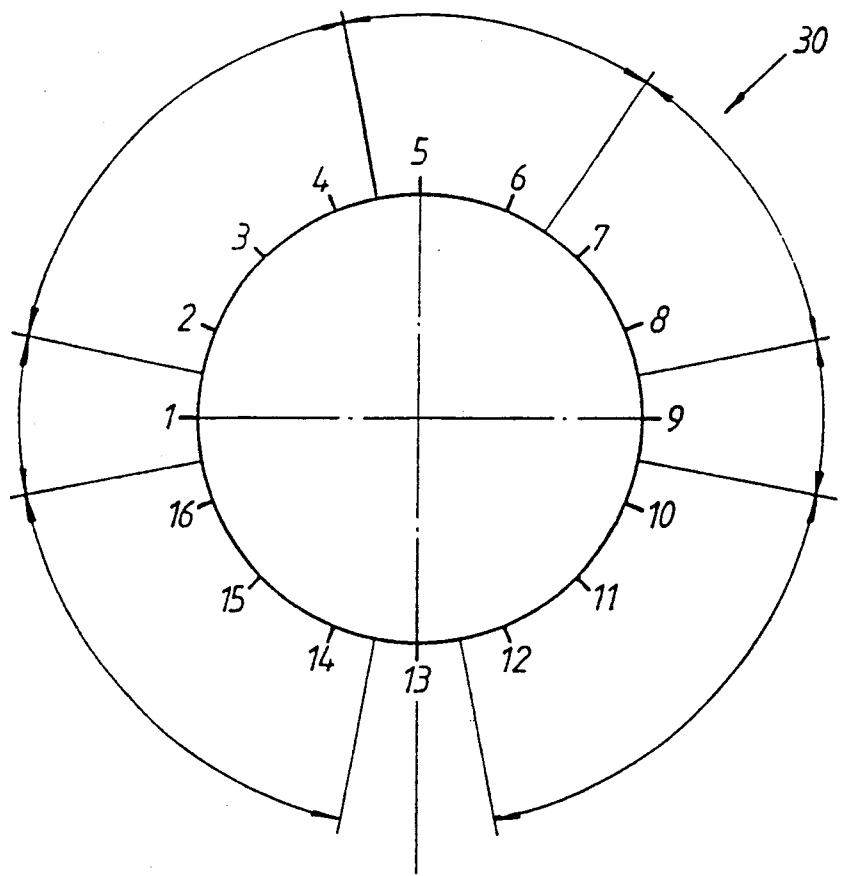
FIG. 4 a diagram of the operating strokes on the bristle side.
Figure 5:
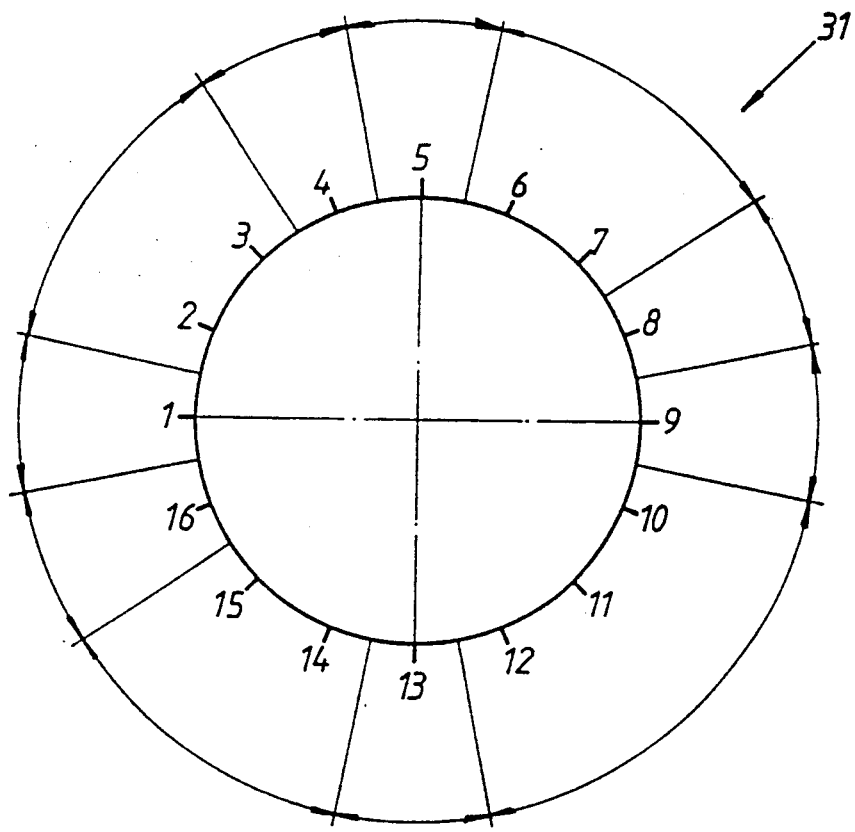
FIG. 5 a diagram of the operating strokes on the bristle carrier side.

The working strokes on the bristle and bristle carrier side described relative to FIG. 3a-3v are diagrammatically shown in FIGS. 4 and 5 by means of a circle diagram. FIG. 4 is a view of turntable 30, in whose station 1 the bristles are supplied, whilst in the following stations 2 to 4 the bristle ends are melted and are shaped in stations 5 and 6. In stations 7 and 8 the bristle head is cooled, whilst in station 9 the bristle carrier and bristles are brought together and secured to one another. In stations 10 to 12 the bristle carriers and bristles are kept in contact with one another and in position 13 the clamping device is released and the bristle carrier with the bristles is transferred to the turntable 31. The clamping device is cleaned in stations 14 to 16.

FIG. 5 shows the sequence diagram on turntable 31. In position 1 the bristle carriers are inserted in the holders on turntable 31, in station 2 and 3 the bristle carriers are optionally printed or stamped, whilst in station 4 the returning heating and punching device is cleaned. In stations 5,6 and optionally 7, the bristle reception side of the bristle carrier is brought into the soft plastic state and optionally additionally reception holes are made. In position 8 the bristle carrier is reversed and is transferred from turntable 31 to turntable 30 and brought into contact with the bristle ends. During this contact time extending on turntable 30 over stations 9 to 12, the turntable 31 has idle strokes. In position 13 the bristle carrier with the bristles fixed to it is returned to turntable 31 and is there end-worked in stations 14 and 15. Finally, in station 16 the bristle carrier is removed from the holder on turntable 31.

Figure 6:
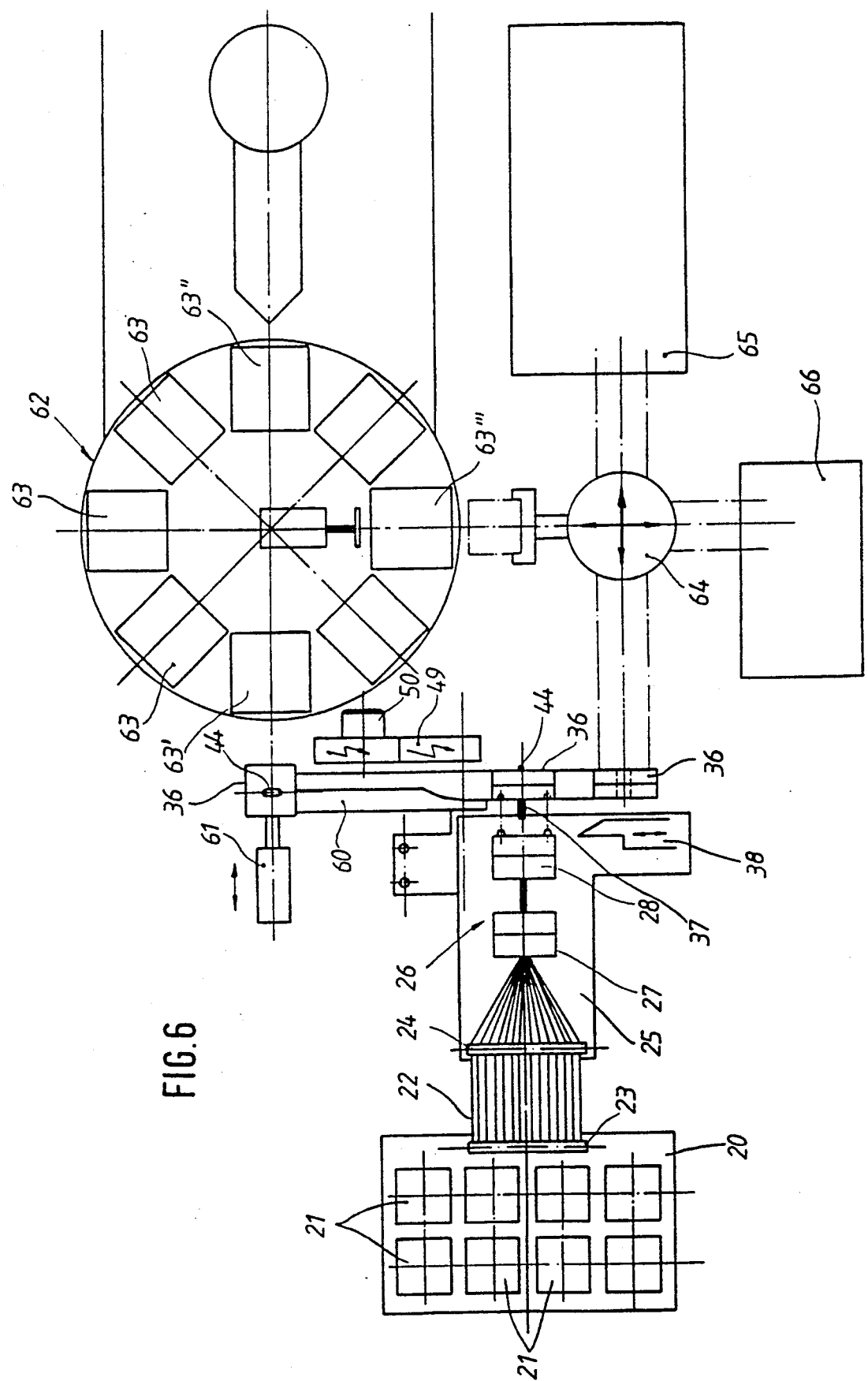
FIG. 6 a view similar to FIG. 2 of another embodiment with injection moulds.

In the embodiment according to FIG. 6 the reel frame and bristle supply device are constructed in the same way as in the embodiment of FIGS. 1 and 2, so that there is no need to describe these again. Once again there are several clamping devices 36 on a turntable 60, but they are in this case detachably connected thereto. After inserting the bristles in the clamping device 36 located in the supply device 25, the bristle ends 37 are cut to size at their trailing end by means of the cutting mechanism 38, whilst the leading bristle end 44 projects over the clamping device 36. Following one or more indexing cuts they reach a heating device 49 and then a shaping means 50, in which the melted bristle ends 44 are shaped into a head. This is optionally followed by a not shown cooling device. Upstream of or in the transfer station with the axially parallel acting transfer device 61 the clamping devices 36 are turned by 90°, so that they are located in a horizontal plane.

On a horizontal rotary table 62 are arranged several injection moulds 63 with the same angular spacing. In the injection mould 63' located at the transfer station the clamping device 36 located in a plane parallel to the rotary table 62 is transferred by means of the transfer device 61, brought with the other mould parts into the closing position and finally injection moulding takes place in position 63''. The injection mould then passes through one or more cooling stations and is opened in position 63''', where the injection moulding is removed. By means of a manipulator 64 the clamping devices are removed from the rotary table and placed on turntable 60, whilst the released injection mouldings are transferred to following processing station 65, e.g. for trimming, rounding, etc. Optionally the manipulator can transfer the complete brushes or the like from stations 65 to a pattern plant 66.

Figure 7:
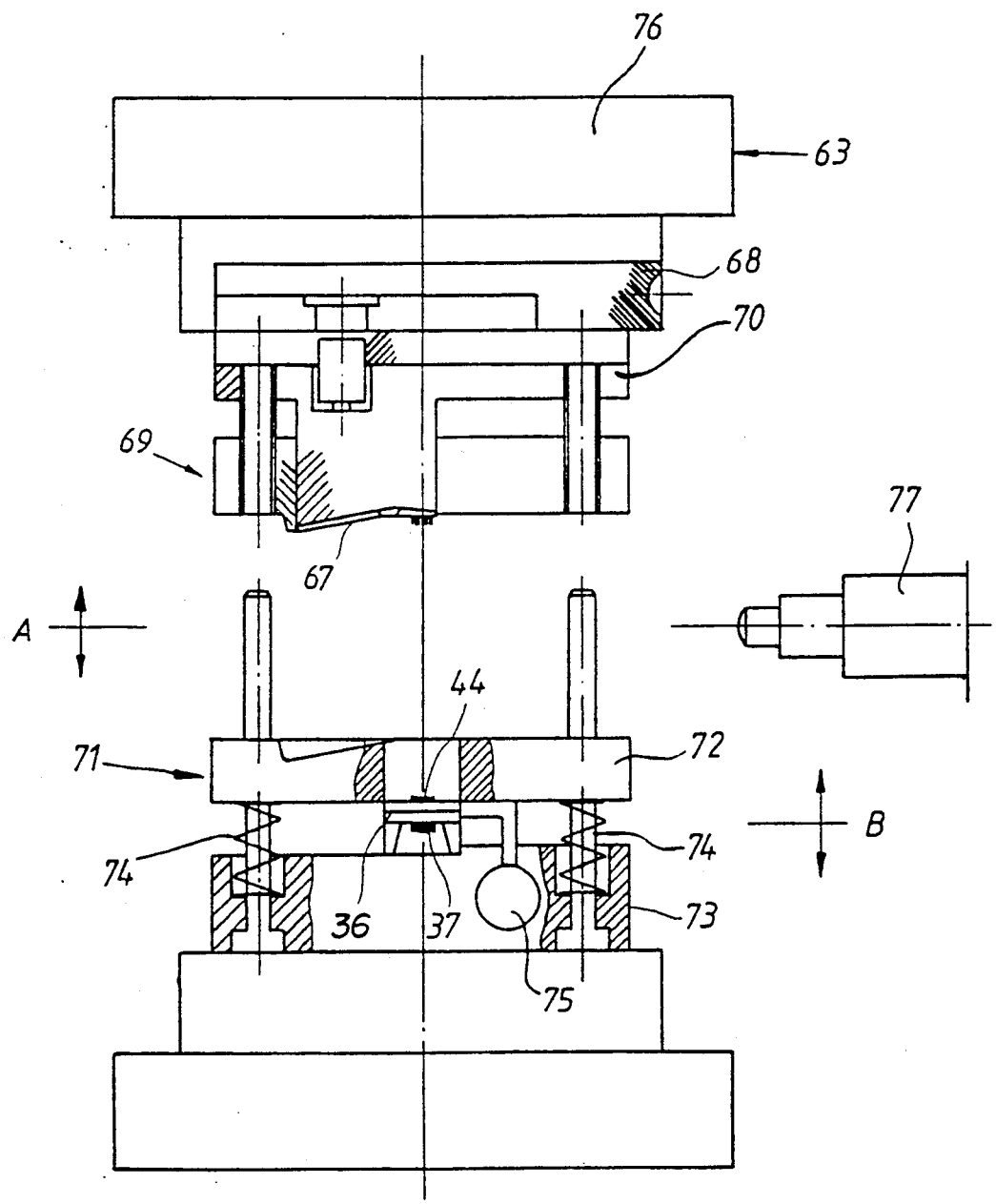
FIG. 7 a diagrammatic view of a single injection mould.

FIG. 7 shows an embodiment of injection mould 63, such as is suitable for producing brushes with handles, such as toothbrushes 67 or the like. The injection mould has a main separating plane A and a further separating plane B. In the main separating plane A the injection moulding is removed from the mould, whilst in the further separating plane B there is a transfer of clamping device 36 from turntable 60 to rotary table 62 and back again. FIG. 7 shows the injection mould in the open position during mould release (position 63''' in FIG. 6). The injection mould 63 has a hot runner mould system 68 and a cavity side mould part 69, into which is integrated a contour ejector plate 70. The force side moulding unit 71 is formed by a mould part 72 and the clamping device 36, which is displacable with respect to mould part 72. The clamping device is located on a transfer table 73 and is released by the springs 74 forcing the mould part 72 upwards. A device 75 for releasing the clamping device 36 is also arranged on the injection mould, e.g. at transfer table 73.

The cavity side mounting plate 76 can be moved downwards together with the mould part 69 until the main separating plane A is closed. During the further downward stroke the gap in the second separating plane B is closed and the upper face of the clamping device 30 is finally terminated flush with the contour of the mould part. In this position injection moulding takes place by means of unit 77. On mould release the mounting plate 76 moves upwards and before hand the clamping device 36 is released. During the upward movement the mould part 72 initially follows this, whilst the clamping device remains on the transfer table 73, so that it releases the bristles and is finally freed from mould part 72. In this position the clamping device 36 with the manipulator 64 (FIG. 6) can be moved back on turntable 60, whilst the injection mould, in this case toothbrush 67, is removed from the mould by means of the injector plate 70 and is also removed with the manipulator 64.

I claim:

1. Process for producing bristle articles made from plastic bristle carriers and bristles, in that the bristles in an arrangement and number corresponding to the bristle coverage are introduced into reception openings of one part of an at least two part mould in which the bristle carriers are produced by injection moulding and several moulds on an endless closed first movement path are moved past a station supplying the plastic for the bristle carrier, said endless first path comprising at least one cooling station and removal station for the finished bristle articles, wherein the bristles are fixed by a clamping device having the reception openings and forming said one part of the mould and several clamping devices are guided on a second movement path with at least one processing or treatment station for the bristles and that the clamping devices together with the bristles are transferred to the first movement path at a transfer station by connecting a clamping device with at least a second part of the at least two-part mould to complete the mould, the bristle carrier is injection moulded, and the clamping devices are returned to the second movement path following cooling and removal of the bristle articles.

2. Process according to claim 1 wherein the bristle-receiving clamping devices on the second movement path are moved past a supply station in which the bristles are introduced into the clamping device, at least one heating station where the fixed ends of the bristles are melted and a cooling station, prior to their passing into the transfer station.

3. Process according to claims 1 or 2 wherein the melted bristle ends on the second movement path are shaped in a shaping station between the heating station and the cooling station to form a head or a plate.

4. Process according to one of the claims 1 or 2, wherein the finished bristle article, following the removal station, undergoes reworking at one or more further stations of another movement path.

5. Process according to claim 1, wherein the bristles are provided in the form of an endless strand, the latter is fixed by its leading end in the clamping device and the bristles are cut to length at a distance from the leading end of the endless strand corresponding to the desired length, plus the length necessary for the fixing thereof.

* * * * *